UNITED STATES PATENT OFFICE.

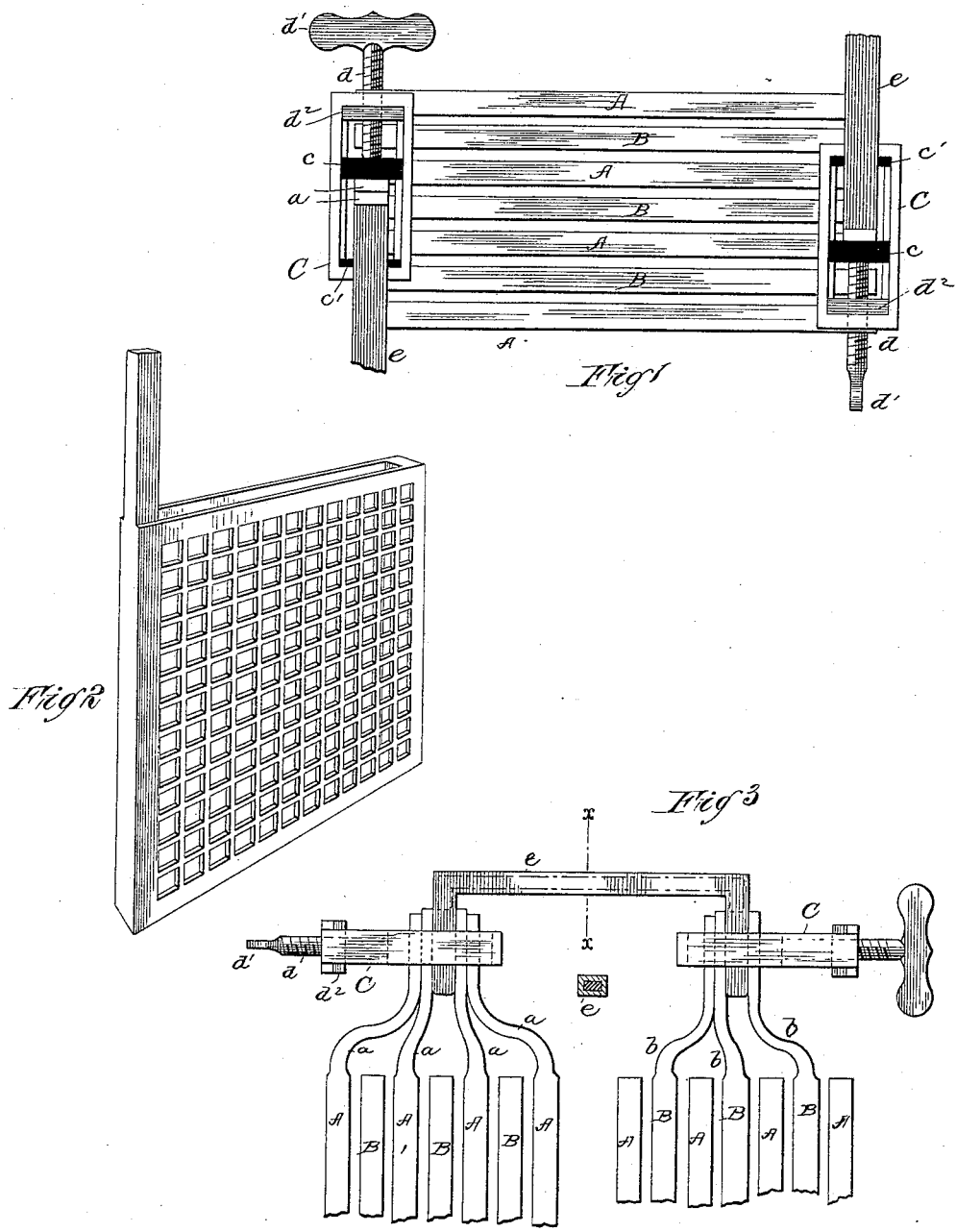

HENRY H. WIEGAND, OF BALTIMORE, MARYLAND.

CONNECTOR FOR SECONDARY BATTERIES.

SPECIFICATION forming part of Letters Patent No. 394,897, dated December 18, 1888.

Application filed April 17, 1888. Serial No. 270,906. (No model.)

*To all whom it may concern:*

Be it known that I, HENRY H. WIEGAND, a citizen of the United States, residing in Baltimore, in the State of Maryland, have invented certain new and useful Improvements in Secondary Batteries; and I do hereby declare that the following is a full, clear, and exact description of my invention, such as will enable others skilled in the art to which it appertains to make and use the same.

My invention relates to secondary batteries, with particular reference to the construction of the plates or grids and the clamp for connecting into groups plates of like polarity and for connecting the groups with each other or with the conductors leading to and from the battery. The grids are cast in a single piece or constructed of two sheets burned or otherwise joined together at the edges, forming a hollow box, or with an interior chamber for the active material. The side walls are perforated, and when the active material is pressed into the chamber it is forced out into and fills the perforations, or when the grid is composed of more than one piece the active material may be previously pressed into a form corresponding to the inner chamber. An extension of one side of the grid constitutes the plate-terminal. The clamp for connecting the terminals is designed to unite them in such a manner that the fluids of the battery cannot penetrate and corrode the joint, and thus impair the contact. The clamp itself is constructed to withstand the action of the acids and to be quickly and conveniently manipulated.

In the accompanying drawings, Figure 1 represents a plan of a cell, showing the plates or grids coupled up by means of my improved clamp. Fig. 2 is a perspective view of one of the plates, and Fig. 3 is an end elevation of the plates of two different cells connected up by mean of a novel coupling-strip and the clamps.

A and B represent, respectively, the positive and negative plates of the battery. As is usual, they are in alternating order and stand vertically in the cell with strips of rubber separating them. The terminals $a$ of the positive plates are arranged on one side, while the terminals $b$ of the negative plates are arranged on the opposite side, of the cell. The terminals rise vertically from one corner of the plate and are of the same material as the grid itself, being cast therewith, or formed of the same material as the grid when the plate is constructed in any other manner described. As shown in Fig. 2, the grid is cast or formed hollow, with its sides perforated and three of its edges closed, the fourth being left open as a means for inserting the oxide or other excitant. After the grid has been charged with the excitant the opening may be sealed up by soldering or otherwise.

The clamp consists of the frame C, composed of any suitable insulating material or of metal coated with an insulating substance, or with an alloy similar to that of which the grids are composed. Within the opening of the frame are located two blocks of insulating material, $c$ and $c'$, one fixed against the end of the frame and the other movable in suitable ways formed in the frame. A screw, $d$, having a cross-head, $d'$, passes through a hole in the end of the frame without touching, and works in a fixed nut, $d^2$, formed of the same kind of metal as the screw, but insulated from the frame. The inner end of the screw abuts against the movable block $c$ and is adapted to force it toward the fixed block $c'$. Instead of the fixed nut $d^2$, I may pass the screw through insulating material fixed in the end piece of the frame or through the end piece of the frame itself when the frame is a non-conductor.

The connecting-strip $e$, for the purpose of connecting up the groups of plates in the different cells or for making connections with line, has a peculiar construction. The exterior is composed of the same material that forms the grids, while there is a core of copper for reducing the resistance of the strip and to facilitate the operation of making line-connections. In performing this operation the exterior metal is removed with a knife or in any other convenient manner and connection made directly with the copper.

To connect up the plates and groups of plates, the adjacent faces of the plate-terminals are scraped and slightly roughened, and the ends of the connecting-strip treated in the same manner. They are all then brought together in the manner shown and inserted in the opening in the frame of the clamp between the two blocks of insulating material. The block c is then forced up against them, pressing the parts until the roughened faces become knit together. The opening in the frame is somewhat wider than the terminals, so that the latter do not touch the frame at all, but are held between the insulating-blocks.

It will be seen that this clamp may be used to connect up a few plates or many, at will; that it is easily handled; that it facilitates and secures the safe removal and replacement of the plates; that perfect insulation is secured, and that the liability of the contact-surfaces to corrode is reduced to the lowest degree.

I have described the clamp in connection with secondary batteries only; but it is obvious that it is equally applicable to primary batteries.

Having now described my invention, what I claim is—

1. The combination, with the terminals of the plates of a battery, of a clamp for connecting them all together, consisting of a frame carrying adjustable jaws of insulating material adapted to be forced against the terminals to bind them together, as described.

2. The combination, with battery-plate terminals, of a clamp whose parts are all electrically insulated from each other and acid-proof, and having a pair of jaws movable with respect to each other.

3. The frame C, of insulating material, screw d, and fixed and movable insulating-jaws c and c', in combination with the terminals of the battery-plates.

4. A connecting-strip for coupling up a battery, composed of a metal similar to the metals with which it is put into contact and provided with a core of metal possessing a high degree of electrical conductivity.

In witness whereof I have hereunto affixed my name in the presence of two subscribing witnesses.

HENRY H. WIEGAND.

Witnesses:
THOS. KELL BRADFORD,
W. D. WIEGAND.